United States Patent Office
2,888,348
Patented May 26, 1959

2,888,348

NEW FOOD PRODUCT FOR CATTLE AND PROCESS FOR ITS MANUFACTURE

Lorenzo Rodriguez Fuentes, Havana, Cuba

No Drawing. Application December 17, 1956
Serial No. 628,510

Claims priority, application Cuba June 13, 1956

8 Claims. (Cl. 99—6)

The present invention is directed to a new feed product for cattle and a method for manufacturing the same, said invention being an improvement on the processes for manufacturing feed products described in Cuban Patents No. 14,400, dated November 13, 1951, and No. 14,450, dated February 5, 1952.

In different experiments carried out with the processes covered by the above said patents, I have been able to determine that real improvements are obtained, both in the process as well as in the resultant product, as I hereinafter explain.

Cachasse (scum), also called cachaza, is a consequence of clarification of sugar cane juice which after it has been extracted from the cane by compression in mills contains particles of the parenchyma or cellular structure of the stalk, together with gums, resinous bodies and waxes, and proteins from the cane.

These bodies are suspended in the juice in very fine particles in the form of colloids which can only be separated by decantation or filtration preceded by liming, which facilitates sedimentation and produces a pH in the juice sligthly above 7.0.

This product of clarification or cachasse when filtered leaves on the filters the said cachasse together with a certain amount of sugar cane juice in a proportion of 70% and in which there is a certain proportion of the sugar of the original juice despite the washing of said residue.

The solid part of this residue or cachasse is composed, therefore, of the aforementioned vegetable residue. The liquid part is a sugared liquor which is susceptible to fermentation.

Cachasse was taken from a filtering equipment, taking care that its pH value was under 7.0 and submitted to dehydration in a conventional type drier, first having added thereto blackstrap molasses in an amount equal to the weight of the solids of said cachasse.

After approximately four hours a solid product of sweet taste and dark greenish color with a humidity lower than 4% was obtained.

From this solid product, submitted to the action of a hammer mill, there was obtained a powder of very low or nil hygroscopicity and an average analysis as follows:

| | Percent |
|---|---|
| Humidity | 4.00 |
| Carbohydrate | 40.00 |
| N.F.E. (Free nitrogen extracts) [1] | 40.00 |
| Protein | 6.20 |
| Ashes | 9.00 |

[1] With 60% digestibility.

Through tests, said powder demonstrated great palatability, both for ruminants and for swine, and may be considered with a food value superior to any pasture.

In another test, the cachasse was mixed with molasses as aforementioned, but previously submitting the cachasse to an appropriate fermentation, without separating the cachasse-yeast mixture.

An illustrative example of the test is as follows:

An inoculation of fresh yeast was added to the damp cachasse from the filtering equipment in the proportion of one gram per cubic foot of cachasse, taking care to obtain the most perfect mixture possible, this being attained by previously dissolving the yeast in water and adding this solution to the damp cachasse in a mixer.

This mixture was likewise fermented and then dried in a conventional drier whereby there was formed a product in every way similar to that previously set forth but having a lighter color.

After six hours it was observed that the residual liquid of the cachasse had completely fermented, and that the content of cells of the yeast had increased in a proportion of 1:2.

Repeating the operation, but allowing the gases from the quadruple-effect pump of the mill to pass through the mass, it was observed that the growth of the yeast in the same period of time was 1:4.

These non-condensable gases from the quadruple evaporating equipment of a sugar mill contain ammoniacal nitrogen from the decomposition of the proteins of sugar cane which, being in the alkaline medium of the juice injected into the evaporator, separate therefrom and are drawn by the non-condensable gas pump together with the air and other gases which are dissolved in the juice.

The cachasse-yeast product, mixed on the basis of its solids with its weight in molasses, was dried in a conventional type drier giving a product which, after being ground, has the characteristic of presenting an increase in crude protein superior to the level of the previous example, said level reaching 20%.

It was observed that the mixture of the cachasse yeast obtained in accordance with the process covered by the aforementioned Cuban Patent No. 14,400, at least with its weight in blackstrap molasses and dehydrated in any conventional type drier gives a solid product which is easily powdered by a hammer mill.

The invention and the manner of achieving it having been described, I claim the following:

1. The process of manufacturing a new cattle feed comprising substantially completely yeast fermenting cachasse having a pH below about 7, mixing with the fermented cachasse sugar cane molasses in an amount at least equal to the solids-content of the fermented cachasse, and drying the resulting mass.

2. The process of manufacturing a new cattle feed comprising substantially completely yeast-fermenting cachasse having a pH below about 7, mixing with the fermented cachasse a mix-ingredient selected from the group consisting of blackstrap molasses and inverted molasses, in an amount at least equal to the solids-content of the fermented cachasse, and drying the resulting mass.

3. The process set forth in claim 2 in which the resulting mass is dried to a water-content of 4%.

4. The process set forth in claim 2 in which the fermenting agent is a torula yeast.

5. The process of manufacturing a new cattle feed comprising substantially completely yeast-fermenting cachasse having a pH below about 7 in the presence of ammoniacal gases derived from the quadruple-effect pump of a sugar mill apparatus to increase the amount of fermenting yeast grown in a predetermined amount of time, combining with the fermented cachasse a mix-ingredient selected from the group consisting of blackstrap molasses and inverted molasses, in an amount at least equal to the solids-content of the fermented cachasse, and drying the resulting mass.

6. The process of manufacturing a new cattle feed comprising substantially completely yeast-fermenting cachasse having a pH below about 7 in the presence of ammoniacal gases derived from the sugar cane process to increase the amount of fermenting yeast grown in a predetermined amount of time, mixing with the fermented cachasse sugar cane molasses in an amount at least equal to the solids-content of the fermented cachasse, and drying the resulting mass.

7. A new cattle feed composition comprising a substantially dry mixture of yeast-fermented cachasse and sugar cane molasses, said molasses being present in an amount at least equal to the solids-content of the fermented cachasse.

8. A new cattle feed composition comprising a substantially dry mixture of yeast-fermented cachasse and a mix-ingredient selected from the group consisting of blackstrap molasses and inverted syrup, said mix ingredient being present in an amount at least equal to the solids-content of the fermented cachasse.

References Cited in the file of this patent

UNITED STATES PATENTS 2,170,713    Jattinger _____ Aug. 22, 1939